United States Patent [19]

Maus

[11] Patent Number: 4,741,210
[45] Date of Patent: May 3, 1988

[54] METHOD AND APPARATUS FOR BRINGING ROTATING BODY TO STANDSTILL

[75] Inventor: Otfrid Maus, Darmstadt, Fed. Rep. of Germany

[73] Assignee: Schenck Auto-Service-Gerate GmbH, Fed. Rep. of Germany

[21] Appl. No.: 742,098

[22] Filed: Jun. 6, 1985

[30] Foreign Application Priority Data

Jul. 18, 1984 [EP] European Pat. Off. ...... 84 108 464.3

[51] Int. Cl.⁴ ............................................. G01M 1/18
[52] U.S. Cl. .................................... 73/462; 364/551; 364/508
[58] Field of Search ....................... 364/508, 506, 551; 73/462, 473, 476, 468, 470, 464

[56] References Cited

U.S. PATENT DOCUMENTS

| | | | |
|---|---|---|---|
| 4,015,480 | 4/1977 | Giers | 364/508 |
| 4,060,002 | 11/1977 | Nortensen | 73/462 |
| 4,064,761 | 12/1977 | Giers et al. | 73/462 |
| 4,155,255 | 5/1979 | Sherman et al. | 73/462 |
| 4,214,481 | 7/1980 | Deutlinger | 73/462 |
| 4,262,536 | 4/1981 | Orem et al. | 364/508 |
| 4,423,632 | 1/1984 | Madden et al. | 73/462 |
| 4,441,355 | 4/1984 | Rothamel | 73/462 |
| 4,450,529 | 5/1984 | Hill et al. | 364/508 |
| 4,457,172 | 7/1984 | Mathes et al. | 364/508 |
| 4,464,934 | 8/1984 | Giers | 73/462 |
| 4,480,472 | 11/1984 | Wood | 364/508 |
| 4,502,328 | 3/1985 | Wood et al. | 364/508 |
| 4,608,650 | 8/1986 | Kapadia | 364/508 |

FOREIGN PATENT DOCUMENTS

| | | | |
|---|---|---|---|
| 0074416 | 3/1983 | European Pat. Off. | |
| 2949542 | 6/1981 | Fed. Rep. of Germany | |
| 0030924 | 2/1982 | Japan | 364/508 |
| 0132641 | 8/1983 | Japan | 364/508 |
| 1266445 | 3/1972 | United Kingdom | 364/508 |

OTHER PUBLICATIONS

Kokusai Keisotsuki K.K., Patents Abstracts of Japan, vol. 7, No. 249, (p. 234) (1394), Nov. 5, 1983, JP-A-58 132 641.

Primary Examiner—Parshotam S. Lall
Assistant Examiner—V. N. Trans
Attorney, Agent, or Firm—Connolly and Hutz

[57] ABSTRACT

Method and apparatus are described for bringing a rotating body, set in rotation by a drive, to a standstill as the conclusion of a work cycle. The rotating body may be placed in bearings in a balancing machine where it is investigated for unbalance. Characteristic values for the drive and the rotating body obtained during the acceleration phase are utilized in conjuction with one another for purposes of stopping the rotating body at an exact and specific position for machining purposes at that position on the surface of the rotating body.

11 Claims, 1 Drawing Sheet

U.S. Patent  May 3, 1988  4,741,210
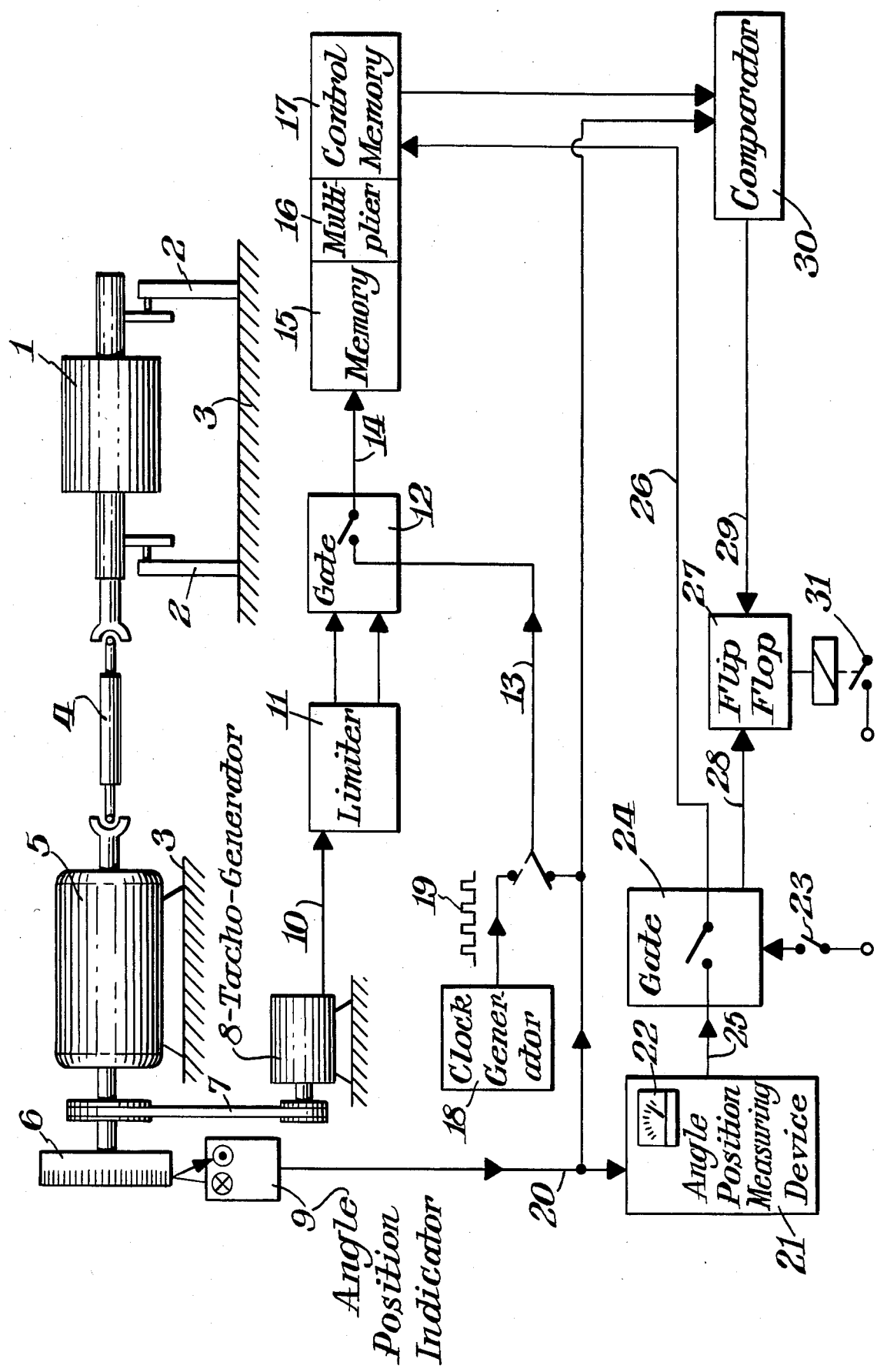

METHOD AND APPARATUS FOR BRINGING ROTATING BODY TO STANDSTILL

BACKGROUND OF THE INVENTION

The present invention relates to a procedure for bringing a rotating body, which is made to rotate by means of a drive, to a standstill at the completion of a work cycle, particularly a rotating body which is placed in bearings in a balancing machine for evaluation with respect to its unbalance.

A procedure is known from DE-AS No. 10 82 066 for balancing rapidly turning machine rotors, particularly of steam turbines and turbo-generators, wherein prior to the balancing process the rotors are brought to a high speed by means of a drive and subsequently disconnected from the drive prior to the actual balancing. The procedure is characterized in that after the balancing process the drive for the balancing body is brought to exactly the same rotating speed as the balancing body. Moreover, when the balancing body and the drive of the balancing device are exactly the same speed, coupling bolts of a coupling device connected to the drive reengage with a coupling disk located on the freely rotating rotor whereupon the rotor is brought to a standstill in short order by means of the drive motor which then functions as a generator. A procedure of this nature is not suitable for bringing a rotating body under investigation to a standstill when a specific point at its circumference is in a certain relation to a point on the balancing machine. For this purpose, an additional indexing procedure is required to locate the rotating body after it is brought to a standstill at an angular position which has been determined during the measurement as an unbalance angle position. The unbalance can subsequently be eliminated at this point by means of machining, for example. Such additional indexing procedures are time-consuming and also cause considerable delays, especially when a balancing machine is installed in a production line. This is particularly true when the point on the rotating body which is to be machined must be indexed to a position in front of a machine tool attached to the balancing machine, which machine tool is not positioned at the assumed zero point for the identification of the unbalance. In such a case, and after the body is brought to a standstill, it is generally necessary to first index the rotating body into that position which corresponds to the coordinate system selected for the unbalance, and subsequently to bring the point to be processed up to the correction tool in a second indexing procedure. It is obvious that the cycle time of the production line is considerably influenced by such an indexing procedure.

Another procedure for balancing rotors is known from DE-AS No. 12 48 335 wherein the drive motor is disconnected from the balancing body after it has reached its speed and then run up to speed a second time after the measurement for reconnection to the balancing body when the motor and the balancing body have the same speed. This is done in order to brake the balancing body by means of the motor. The procedure is characterized in that the energy supply to the drive motor is disconnected as soon as the motor has reached the speed of the balancing body during the second run-up. This procedure for bringing a rotating body to a standstill is not suitable for decreasing the required time for bringing a rotating body to a standstill at a predetermined point for the same reasons discussed above in connection with DE-AS No. 10 82 066.

In the area of machine construction it is frequently necessary to brake rotating bodies of various moments of inertia from their rotating movement in such a manner that they are brought to a standstill at a specific final position. Thus, with respect to turning machines, for example, it is desirable to stop the chuck for the rotating body to be placed in it at a specific point for purposes of opening it. In addition, after the measuring run it is important that the body under investigation in a balancing machine be stopped directly in front of the correcting machine tool. Such is important since the correction point identified during the unbalance measurement may be located at any point on the circumference of the rotor depending upon the location of the unbalance.

As needed, an electric motor, a turbine, or compressed air acting directly at the rotatable body may be used as the drive for the abovementioned general machines and balancing machines. Also direct coupling with the rotating body may be used if the drive comprises an electric motor or turbine. Connection with the body under investigation may be provided via a gear or drive belt. The drive may also be connected to a shaft, on the end of which the chuck of a turning machine or the seat for a vehicle wheel is arranged. The other end of the shaft accommodates an angular reference plate with a fixed connection to the shaft.

SUMMARY OF THE INVENTION

With the above as background, the objective of the invention herein is a procedure for bringing a rotating body to a standstill whereby the point to be machined on the body as defined during a work cycle comes to a standstill at a predetermined position. The significant inventive insight consists that the measurement values obtained during the acceleration in the same work process are utilized for purposes of bringing the rotating body to a standstill at a predetermined point on the surface of the body. During the acceleration phase, the specific characteristics of the rotating body, namely its angular momentum and its friction as well as the influences from the drive including bearing disposition, also constitute criteria for that measurement speed which is to be reached within a specific time span starting from a standstill.

The problem on which the invention is based can also be solved by means of the acceleration phase itself in combination with the characteristics of the rotating body available from memory and used as criteria for the subsequent braking phase.

The criteria obtained and stored during the acceleration phase can be utilized as guidelines for purposes of arriving at the measurement speed required for stopping the rotating body exactly at the desired point of correction.

The characteristics of the acceleration are recorded during a predetermined time span during the acceleration phase. These values are subsequently utilized with the aid of a predetermined constant in order to stop the rotating body. It has been learned how to record only that portion of the acceleration phase which has a predominantly linear progression, for example only from approximately 10% to approximately 70% of the final rate of speed, and to evaluate the remaining two portions by means of a constant. The constant replaces both the asymptotic run-up of the accelerated rotating body to the nominal speed and the first portion of the acceleration, which is determined mainly by a break-away moment that is not always the same.

The recording of the characteristic data, namely angular momentum and friction of an individual rotating body as well as the influence of the drive upon it during its acceleration to the measurement speed during each work cycle, makes the inventive procedure independent of prior empirical standards for bringing a rotating body to a standstill at a predetermined point. If, for instance, a paddle-wheel rotor is accelerated once under normal atmospheric conditions and once in vacuum, it is not necessary to empirically establish in advance the influence of the air friction of the paddles on the braking process. With the procedure according to the invention herein, it is sufficient to record a characteristic curve during the acceleration phase and to subsequently start the braking procedure during the deceleration of the rotor at a specific point in time prior to the desired standstill of the rotating body, or to start at the angular distance or the circumferential distance which can be derived from the stored acceleration curve.

A timing pulse generator can be utilized for storing the values obtained in accordance with the procedures of the present invention. It can also be used after the unbalance measurement phase or after the work phase as a control device for targeted stopping. In accordance with the counted values, the beginning of the braking phase may be calculated backwards from the desired stopping position of the rotating body.

A device may be used which allows the definition of the beginning of the braking phase at the right time prior to the stopping point even with recording of only a portion of the acceleration phase. The entire deceleration range up to the standstill is derived from that portion of the acceleration.

BRIEF DESCRIPTION OF THE DRAWING

Novel features and advantages of the present invention in addition to those noted above will become apparent to those skilled in the art from a reading of the following detailed description in conjunction with the accompanying drawing wherein similar reference characters refer to similar parts and wherein the single FIGURE is a schematic representation of a balancing machine with a rotating body placed in bearings and a motor driving the machine. A block circuit diagram of an electrical control is shown for bringing the rotating body to a standstill at a specific angular position.

DETAILED DESCRIPTION OF THE INVENTION

A rotating body 1 to be investigated is mounted in bearings 2 having swing capability. The bearings are arranged on a base 3 and a motor 5 is also supported by base 3. Motor 5 is connected to body 1 via a coupling 4 which may be in the form of a universal joint and shaft arrangement. However, instead of the universal joint and shaft arrangement, the rotating body may also be set in motion by a belt drive which engages the shaft of the rotating body 1 and is driven by means of a drive plate on the motor 5. Similarly, a turbine may be used as a drive instead of the motor, or a rotating body with paddles may be used, driven by means of compressed air nozzles oriented towards the paddles. In the latter instance braking to a standstill may be accomplished by means of nozzles counteracting the effect of the drive nozzles. Moreover, the rotating body, for example a vehicle wheel, may be arranged at one end of a balancing spindle with an angular graduation scale from 0° to 360° provided at the other end of this spindle. The balancing spindle may be activated via a belt drive from a drive motor.

By means of a suitable connection 7 which in the simplest case consists of a V-belt drive, an angular graduation scale 6 and a tacho-generator 8, either mechanical or electronic, are connected to rotate with the motor 5. The tacho-generator 8 is used to determine the speed of the motor which changes continuously in the acceleration phase from zero to the measurement speed. The angular graduation scale 6 is sensed by an angle position indicator 9 which provides information on the angular position of the unbalance related to a zero angle position. This is done with transducers (not shown) which quantify unbalance information and convert it to electrical voltages, as is well known in the art.

When the motor 5 is energized, the tacho-generator 8 feeds voltages to an output line 10 which voltages correspond to the respective speeds during the acceleration phase of the motor and the rotating body connected for rotation with the motor. A limiter 11 only permits passage of those voltages if greater than 10% the actual speed of the rotating body 1 and less than 80% of such final measurement speed. These voltages control the gate 12. Instead of recording the acceleration profile from 10% to 80% of the final measurement speed, the limiter can also be arranged so that voltages are allowed to pass from the beginning of the rotation and to be fed to actuate the gate 12 until the rotating body has reached its final measurement speed.

Simultaneously, information over the distance travelled by the rotating body 1 is also fed over line 13 to gate 12. This is achieved by sensing one point on the angular graduation scale 6 or, when the angular graduation scale 6 is graduated for 360°, by sensing all angle degrees from the beginning of the rotation until the final measurement speed has been reached. However, in the example and depending on the limiter 11, only that distance travelled between 10% and 80% of the final measurement speed is allowed to pass gate 12 as a characteristic value to output line 14. This characteristic value is stored in a memory 15, and in the present case of only partial recording of the acceleration phase, it is forwarded to a control memory 17 which is responsible for the start of the braking phase after multiplication with a constant value in multiplier 16. When only one portion of the acceleration phase is selected, the asymptotic approximation of a final measurement speed, which is typical for many electrical motors and which is identical to the measurement speed in this case, is avoided as an influence on the numerical characteristic of the acceleration. A greater angle precision for the targeted stopping of the rotating body is thereby achieved. Instead of having the travel information arrive via line 13 from the angular position indicator 9, the utilization according to the invention of a time interval for the subsequent correct braking via a clock generator 18 can also permit the passage of a series of impulses of a fixed frequency 19 as a numerical characteristic via the gate 12 to the output line 14.

Via an additional line 20, the angle position indicator 9 is connected to a measurement device 21 representing the angular position of the unbalance, which device contains a very simple indicator device 22. The unbalance measurement procedure is interrupted when the angle position of the unbalance has been shown, and the braking procedure is initiated over a switch 23. According to the invention, a time switch may replace the indicator device 22, which time switch activates the switch 23 after a preset time and thereby initiates the braking procedure. When the braking procedure is initiated, a gate 24 forwards the measured angle information from the measurement device 21 via the line 25 and a line 26 to the control memory 17 where it subtracts from the numerical characteristics. Comparing the information stored in control memory 17 with the momentary position of the rotor in a comparator 30 establishes the exact point in time when the information from the control memory 17 to the momentary position of the rotor 1 has reached zero. The start of the braking phase of the motor 5 at exactly the correct time is then initiated via an additional input 29 to a flip-flop 27 and an electrical switch 31 controlled by this flip-flop 27. After the completion of the deceleration phase, the rotating body will come to a standstill, whereby the point previously identified by means of measurement for the unbalance correction is located at the correction fixture in such a manner that the corrective machining of the rotating body can immediately start.

Thus, according to the invention, the numerical characteristics of the rotating body 1 and of the drive are established in each acceleration phase of the drive and of the rotating body 1. It is possible that various rotating bodies, each of which may have a different angular momentum to the drives, or different friction, or may be subjected to different influences from the drive, may nevertheless be braked with the same certainty at a predetermined point on the surface of the body which may, if required, be determined by the angular position of the unbalance.

It should be clearly stated that the invention is not limited to balancing machines and it may also be applied to other general machines where stopping at a specific point is required, for example, mass centering machines, machines for measurement of eccentricity which are to be stopped at the "high" or the "low" point, or machines for measuring the uniformity of vehicle tires.

The arrangement for measuring the time span includes limiter 11 which permits passage to output line 14 through gates 12 of voltages generated by generator 8 when the actual speed of the rotor is greater than 10% but less than 80% of the final measuring speed. At the same time, clock generator 18 permits passage of a series of impulses of fixed frequency 19 via line 13 to output line 14 through gate 12.

The arrangement for measuring the distance traveled during acceleration is as follows. Limiter 11 allows voltage to pass through gate 12 to output line 14 when the rotor speed is between 10% and 80%. Also, impulses are conducted from angle position indicator or transmitter 9 via lines 20 and 13, gate 12 and output line 14 to memory 15.

The arrangement for measuring the angular position of unbalance basically comprises angle position measuring device 21. Braking action is initiated by closing switch 23 which, in turn, closes gate 24. Measured angle information from device 21 is then forwarded to memory 17 via lines 25 and 26.

Braking the speed of the rotor occurs through counter current voltage feed to the motor until relay 31 opens.

What is claimed:

1. A procedure for bringing a rotating body to a standstill at a specific point on its circumference as the conclusion of a work cycle including the steps of accelerating the rotating body, measuring the time span during a selected portion of the acceleration phase of the rotating body between a predetermined lower speed limit and a predetermined upper speed limit below the maximum speed of the rotating body, braking the speed of the rotating body from its maximum speed to zero, and utilizing said measured time span of the same work cycle for controlling the beginning of the braking to bring the rotating body to a standstill with a specific point on its circumference relative to a fixed point.

2. A procedure as in claim 1 wherein the work performed on the rotating body at the maximum speed comprises determining the unbalance of the body.

3. A procedure as in claim 1 including the step of adjusting said measured time span by adding a constant amount thereto to compensate for that portion of the acceleration phase when the time span is not measured.

4. A procedure for bringing a rotating body to a standstill at a specific point on its circumference as the conclusion of a work cycle including the steps of accelerating the rotating body, measuring the distance travelled by a given point on the circumference of the rotating body during a selected portion of the acceleration phase of the body between a predetermined lower speed limit and a predetermined upper speed limit below the maximum speed of the rotating body, performing work on the rotating body at the maximum speed, braking the speed of the rotating body from its maximum speed to zero, and utilizing said measured distance of the same work cycle for controlling the beginning of braking to bring the rotating body to a standstill with a specific point on its circumference relative to a fixed point.

5. A procedure as in claim 4 wherein the work performed on the rotating body at the maximum speed comprises determining the unbalance of the body.

6. A procedure as in claim 4 including the step of adjusting said measured distance of the given point on the circumference of the rotating body by adding a constant amount thereto to compensate for that portion of the acceleration phase when the distance is not measured.

7. A procedure for bringing a rotating body to a standstill at a specific point on its circumference as the conclusion of a work cycle including the steps of accelerating the rotating body, measuring the travel in angular position of a given point on the rotating body with reference to a fixed point during a selected portion of the acceleration phase of the body between a predetermined lower speed limit and a predetermined upper speed limit below the maximum speed of the rotating body, performing work on the rotating body at the maximum speed, braking the speed of the rotating body from its maximum speed to zero, and utilizing said measured travel in angular position of the same work cycle for controlling the beginning of the braking to bring the rotating body to a standstill at an exact and specific point on its circumference relative to a fixed point.

8. A procedure as in claim 7 wherein the work performed on the rotating body at the maximum speed comprises determining the unbalance of the body.

9. A procedure as in claim 7 including the step of adjusting said measured travel in angular position of the given point on the rotating body with reference to the test point by adding a constant amount thereto to compensate for that portion of the acceleration phase when the change is not measured.

10. Apparatus for bringing a rotating body in a balancing machine to standstill at a specific point on its circumference, relative to a fixed point, as the conclusion of a work cycle, comprising means for rotating the body, means for determining the speed of the rotating body, means for determining the momentary position of the rotating body, and means for determining the angle of unbalance of the rotating body, a control memory constructed and arranged to store angular travel of the rotating body during a selected portion of the accelerating phase of the rotating body, a limiter constructed and arranged to allow passage to the control memory of the angular travel of the rotating body when the speed thereof is within a predetermined range, means transmitting the measured angle position of unbalance to the control memory, and a comparator for comparing information in the control memory with the momentary position of the rotating body and initiating braking of the rotating body when the difference therebetween is zero.

11. Apparatus as in claim 10 including a clock generator connected to deliver timed pulses to the control memory.

* * * * *